B. G. LAMME.
SPEED CONTROL FOR INDUCTION MOTORS.
APPLICATION FILED OCT. 21, 1916.
1,295,906.
Patented Mar. 4, 1919.
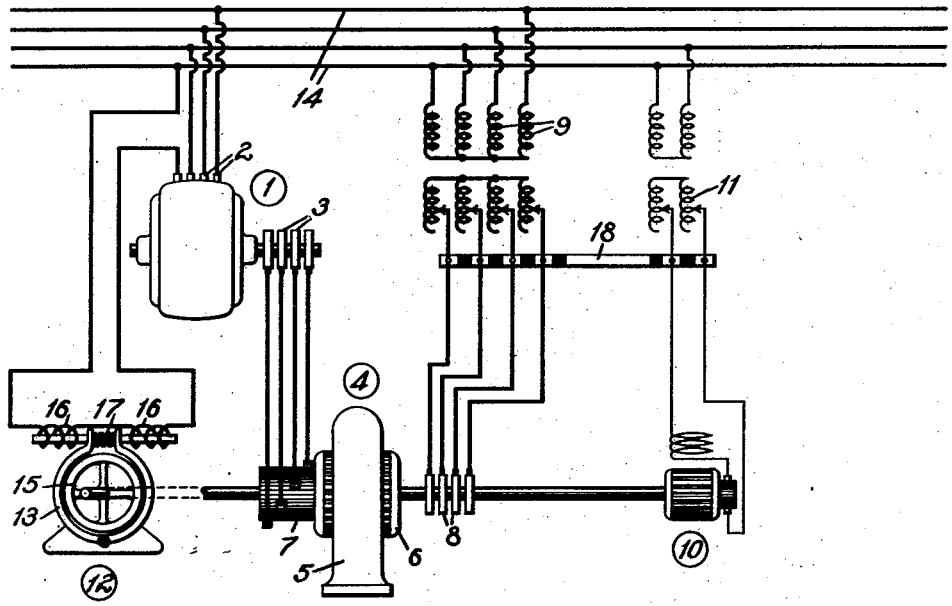
WITNESSES:
INVENTOR
Benjamin G. Lamme.
BY
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SPEED CONTROL FOR INDUCTION-MOTORS.

1,295,906.  Specification of Letters Patent.  Patented Mar. 4, 1919.

Original application filed January 5, 1915, Serial No. 583. Divided and this application filed October 21, 1916. Serial No. 126,905.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Speed Controls for Induction-Motors, of which the following is a specification, this being a division of my copending application Serial No. 583, filed January 5, 1915.

My invention relates to systems of control for dynamo-electric machines, and it has special relation to the speed control of induction motors.

In my copending application, Serial No. 819,717, filed February 19, 1914, I have shown and described a system of speed control for induction motors comprising a frequency converter having, preferably, no field-magnet coils. Said machine is connected to the supply circuit of the induction motor to convert the secondary-winding energy to the primary frequency and is provided with variable-speed driving means. The induction-motor speed is thus regulated by returning energy to the supply circuit through the frequency-converter.

The object of my present invention is to provide driving means for the above-indicated purpose which shall possess certain desirable automatic speed-regulating characteristics.

According to my present invention, I provide, in conjunction with the induction motor to be regulated and the frequency converter, as set forth in my above-identified copending application, a driving motor for the converter, and electro-responsive braking means, actuated in accordance with the load on the induction motor, for automatically varying the speed of the driving motor substantially in proportion to the "resistance slip" of the induction motor, as will be hereinafter more fully disclosed.

The single figure of the accompanying drawing is a diagrammatic view of an induction motor, together with its attendant supply and control circuits and allied auxiliary apparatus, constructed in accordance with a preferred form of my invention.

In the normal operation of induction motors, the speed of the secondary or rotor winding tends to decrease, as the motor load increases, by an amount corresponding to the product of the resistance of the secondary circuit and the current flowing therethrough. However, when the above-mentioned frequency converter is employed, a counter-electromotive force take the place of a portion of the said resistance, the remainder including the resistance of the secondary winding, the frequency-converter winding, brush contact, etc., and the resistance of any other auxiliary series-connected apparatus.

For the most stable operation, it appears that the induction motor should vary in speed, when controlled by the frequency converter, in substantially the same proportion as that mentioned above; namely, by an amount approximately in accordance with the respective ohmic losses in the total secondary circuit, as the motor load varies. Therefore, the frequency converter would have to vary in speed to a corresponding degree, and I provide means for rendering this action automatic. Thus, assuming that the frequency converter, which, at synchronism, delivers a current of zero frequency, is driven below synchronism to increase the frequency delivered from the induction motor secondary winding, then with an increase in the load of the induction motor, the driving motor should automatically decrease in speed to a value approximately corresponding to the "resistance slip" of the induction motor. On the other hand, in case the frequency converter is driven above synchronism for giving the increased secondary-winding frequency, the driving motor should automatically rise in speed to the proper value, when an increase in the induction-motor load occurs.

The automatic variation in the speed of the driving motor just recited will be small relative to the wide range of speed which the motor must undergo for producing the desired speed adjustment of the induction motor. These two speed changes are, therefore, to a great extent, independent of each other and should not be confused. Under the regulating conditions mentioned, any tendency of the entire set of machines to "hunt" is substantially avoided.

Referring to the drawing, a main induction motor 1 is provided with stator terminals 2—2 and with rotor terminals in the form of slip rings 3—3. Energy for the operation of the motor 1 is derived from any suitable source, such, for example, as a polyphase system of distribution 14 and is supplied directly to the motor 1 through the stator terminals 2—2. A frequency-converter 4 is provided for the speed control of the motor 1 and comprises a stator member 5 and a rotor member 6 provided with a commutator 7 and with slip rings 8. The frequency converter 4 needs no further description, being a well-known form of apparatus and conforming, for example, to the machine described and claimed in Patent No. 682,942, issued to the Westinghouse Electric & Manufacturing Company on Sept. 17, 1901, upon an application filed by myself.

The slip rings 3—3 of the main induction motor are connected to the commutator 7 of the machine 4, and the slip rings 8 of the machine 4 are connected to the system 14 through adjustable transformers 9—9.

The frequency-converter 4 is driven by any suitable means having a falling load-speed characteristic, such, for example, as a series commutating alternating-current motor 10 connected to the mains 14 through an adjustable transformer 11, preferably interlocked with the transformers 9—9, as by a link 18. An electro-mechanical brake 12 of well-known form is mounted upon the shaft of the frequency converter 4 and comprises shoes 13 embracing a drum 15 and subject to the operation of oppositely-wound solenoids 16—16 which tend to compress a spring 17. The solenoids 16—16 are energized in accordance with the load upon the main induction motor 1, as, for example, by being inserted in one of the main supply conductors thereof, as shown, or by being energized through current transformers.

Having thus described the arrangement of a system embodying my invention, the operation is as follows. If the voltage supplied to the frequency converter is held constant and the speed is varied, the frequency obtained from the commutator is proportionately varied, always corresponding to the degree of departure from synchronous speed, but the voltage at the commutator end remains constant or substantially proportional to that impressed upon the collector rings. As a result, it is possible to independently vary the voltage and frequency delivered to the secondary winding of the induction motor, the voltage being controlled by the regulating transformers and the frequency being controlled by the speed of the frequency converter.

When the induction motor is at approximately synchronous speed, the frequency in its secondary winding is very low and the voltage across the winding is substantially zero. Assuming, for instance, a slip of 2%, which signifies a secondary frequency of 2% of that in the primary winding, the frequency converter is operated to produce, from the commutator, a frequency of 2% of the supply-circuit frequency and a voltage of practically zero. That is, the frequency converter is run with no impressed voltage and at a speed corresponding to a 2% drop from synchronous speed, since the frequency delivered from the commutator varies in proportion to the departure from the speed of synchronism, as hereinbefore stated.

At 10% slip in the induction motor, part of the secondary voltage is employed in sending current through the secondary winding and the remainder must be compensated for by the frequency changer. The latter machine is therefore regulated to deliver 10% of the line frequency, that is, to run at 10% from synchronous speed and at a voltage slightly less than the exact 10% voltage. Under these conditions, the induction motor may be operated at 10% below synchronous speed without rheostatic loss and at practically constant speed for all loads, if desired.

It should be noted that, at synchronous speed, the frequency converter delivers zero frequency at the commutator and may deliver frequency in accordance with its departure from synchronous speed and of the opposite rotation of phases when above synchronism to that when below. Consequently, by proper disposition of the phase relations, the induction motor may be operated above synchronism, provided suitable means are employed for passing the motor through synchronous speed.

The induction motor 1 is started in any well-known manner and, if it is desired to operate at, for example, 75% of synchronous speed, the speed of the driving motor 10 is adjusted at the transformer 11 so that the frequency-converter 4 has 25% of synchronous frequency at its commutator end for supply to the motor 1. The mechanical connection 18 between the transformers 11 and 9 produces the proper adjustment in the transformers 9—9 so that the energy derived from the secondary member of the induction motor 1 is suitably altered in voltage for return to the system 14 and, under these conditions, the motor 1 operates with the desired speed with relatively high efficiency, as is well known in the art.

Assuming an increase in the load on the motor 1, it is desirable, as before pointed out, to produce an increase in frequency supplied by the machine 4 to the secondary winding of the machine 1 corresponding to the resistance slip of the latter under the load change in question, necessitating a decrease in the speed of the frequency-changer. This speed decrease is produced by the brake 12 which exerts a more pronounced braking action upon the drum 15 because of the stronger energization of the solenoid 16—16 brought about by the increased load current and thus slows down the driving motor 10 the desired amount.

Where the power factor of the motor is variable and close regulation is desired, the brake 12 may obviously be energized in accordance with the watt input of the motor, as is well-known in the art.

While I have shown my invention in a preferred form, it will be obvious to those skilled in the art that it is susceptible of various minor changes and modifications without departing from the spirit thereof and I desire, therefore, that only such limitations shall be placed thereupon as are imposed by the prior art or are set forth in the appended claims.

I claim as my invention:

1. The combination with an induction motor, of a speed-controlling frequency changer electrically connected thereto, driving means for said frequency changer, a brake for said driving means, and means for energizing said brake in accordance with the load on said induction motor.

2. The combination with an induction motor, of a speed-controlling frequency changer electrically connected thereto, driving means for said frequency changer, and means for exerting a braking action upon said driving means substantially proportionate to the load on said motor.

3. The combination with an induction motor, of a speed-controlling frequency changer electrically connected thereto, driving means for said frequency changer, an electro-mechanical brake attached to said driving means, and connections for energizing the operating windings of said brake in accordance with the current supplied to said motor.

4. The combination with an alternating-current supply system, of a main induction motor connected to operate therefrom, a frequency changer and adjustable transformers connected between the secondary member of the induction motor and said supply system for speed control of said motor, a driving motor for said frequency changer, means for varying the speed of said motor in accordance with the voltage setting of said transformer, whereby the voltage and frequency of the energy interchanged between said secondary member and said supply system are simultaneously altered in the speed adjustment of said main motor, a brake coupled to said driving motor, and means for adjusting the braking action thereof in substantial accordance with the load of said main motor.

5. The method of varying the speed of an induction motor interchanging energy between its secondary member and a supply circuit through a rotary frequency changer, which comprises braking said frequency changer in substantial accordance with the load on said main motor.

In testimony whereof, I have hereunto subscribed my name this 16th day of Oct., 1916.

BENJ. G. LAMME.